(12) United States Patent
Lin

(10) Patent No.: US 7,324,084 B2
(45) Date of Patent: Jan. 29, 2008

(54) MOUSE DEVICE OF A LAPTOP COMPUTER

(76) Inventor: Hsuan-Yu Lin, No. 1, Lane 328, Sec. 1, Jhongshan Rd., Yonghe, Taipei County 234 (TW)

(*) Notice: Subject to any disclaimer, the term of this patent is extended or adjusted under 35 U.S.C. 154(b) by 559 days.

(21) Appl. No.: 11/032,127

(22) Filed: Jan. 11, 2005

(65) Prior Publication Data

US 2006/0082553 A1    Apr. 20, 2006

(30) Foreign Application Priority Data

Oct. 14, 2004    (TW) .............................. 93216321 U

(51) Int. Cl.
*G09G 5/00* (2006.01)
(52) U.S. Cl. ..................... 345/156; 345/157; 345/163
(58) Field of Classification Search ................ 345/156, 345/157, 163, 165, 166
See application file for complete search history.

(56) References Cited

U.S. PATENT DOCUMENTS

| | | | |
|---|---|---|---|
| 6,107,990 A * | 8/2000 | Fleming, III ................ | 345/157 |
| 6,366,274 B1 * | 4/2002 | Elledge ....................... | 345/163 |
| 7,233,319 B2 * | 6/2007 | Johnson et al. ............. | 345/166 |
| 2004/0189601 A1 * | 9/2004 | Healey ........................ | 345/156 |

FOREIGN PATENT DOCUMENTS

JP    09319483    * 12/1997

* cited by examiner

*Primary Examiner*—Sumati Lefkowitz
*Assistant Examiner*—Seokyun Moon
(74) *Attorney, Agent, or Firm*—Rosenberg, Klein & Lee

(57) ABSTRACT

A mouse device includes a holding member, and a mouse member; the holding member is secured on a laptop computer, and it has a holding room, a signal receiving plate in the holding room, and a stick therein, which is movable within an area of the holding room; the mouse member has a hole on a lower side thereof, and it is held in the holding member and connected to the movable stick with the movable stick being passed into the hole thereof; the mouse member has a signal transmitting unit on a lower side thereof, which can give signals to the signal receiving plate, such that one person can move a cursor by means of sliding the mouse member so as to move the signal transmitting unit within the signal receiving plate.

5 Claims, 5 Drawing Sheets

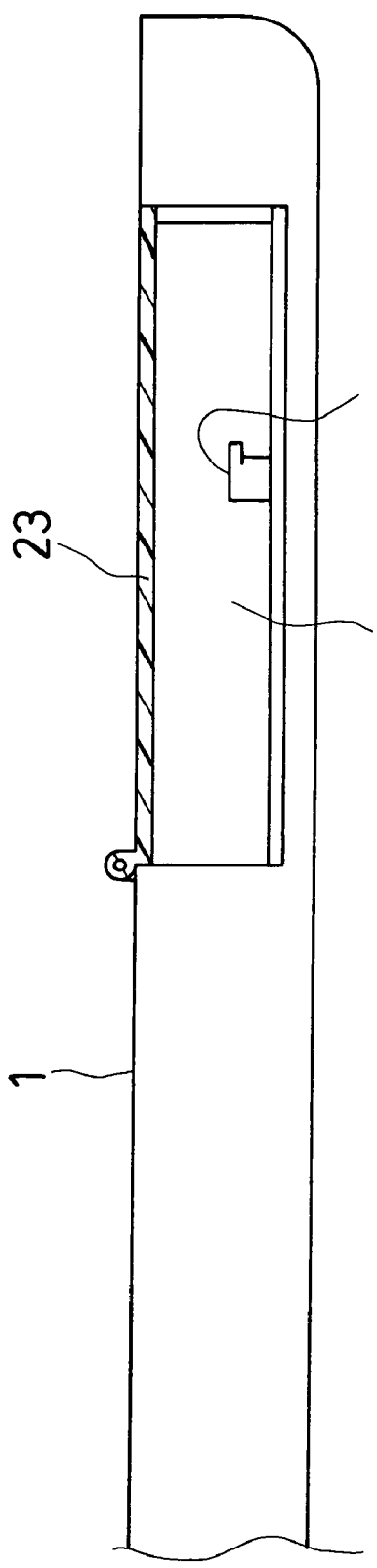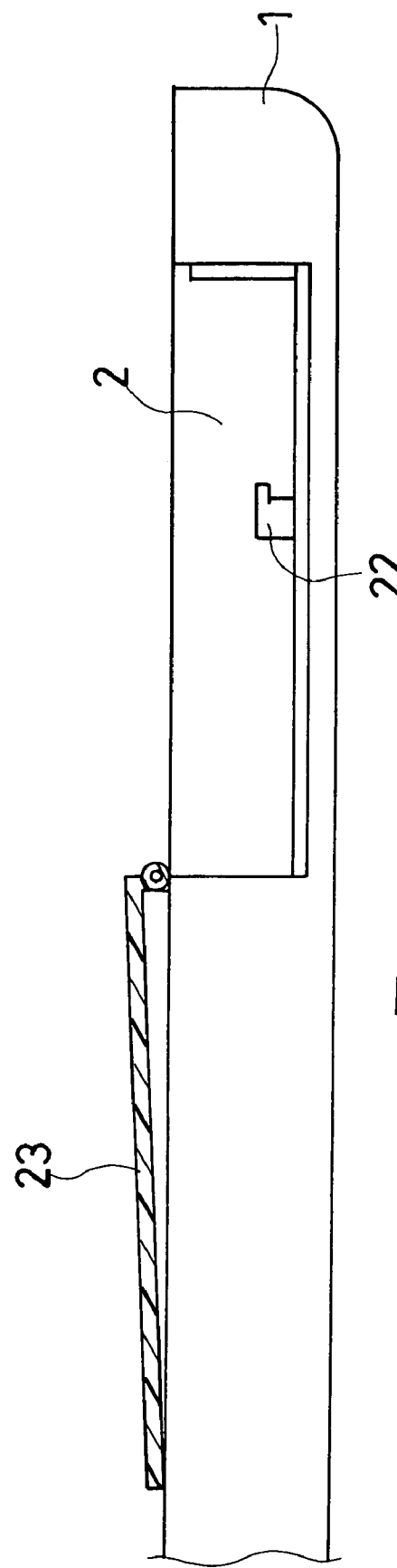

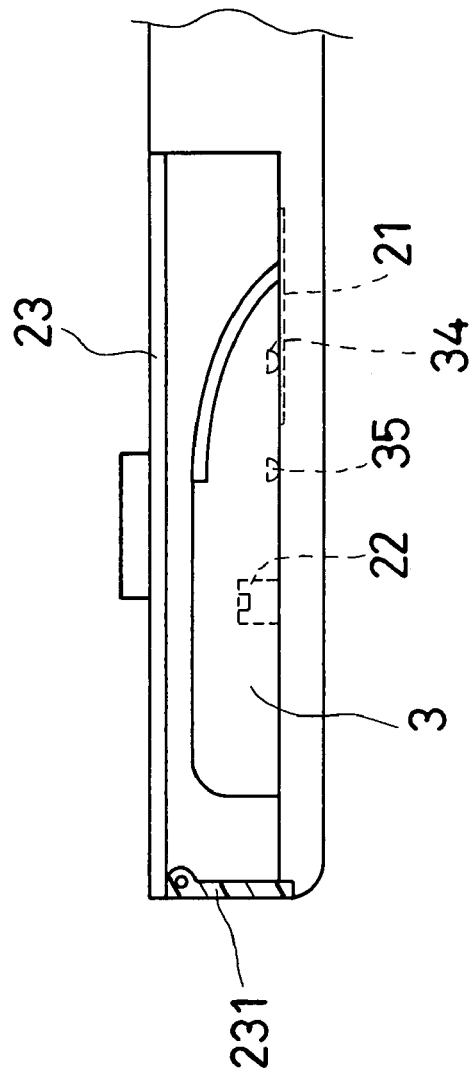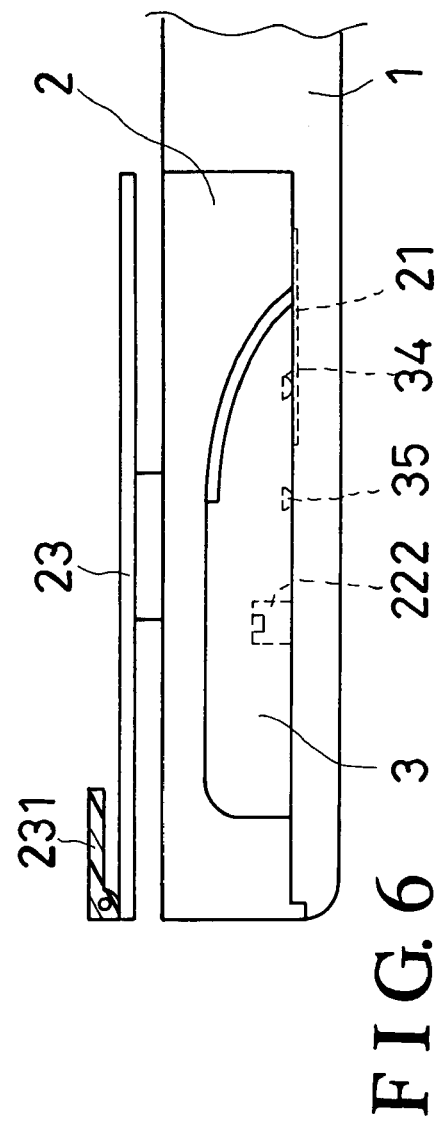

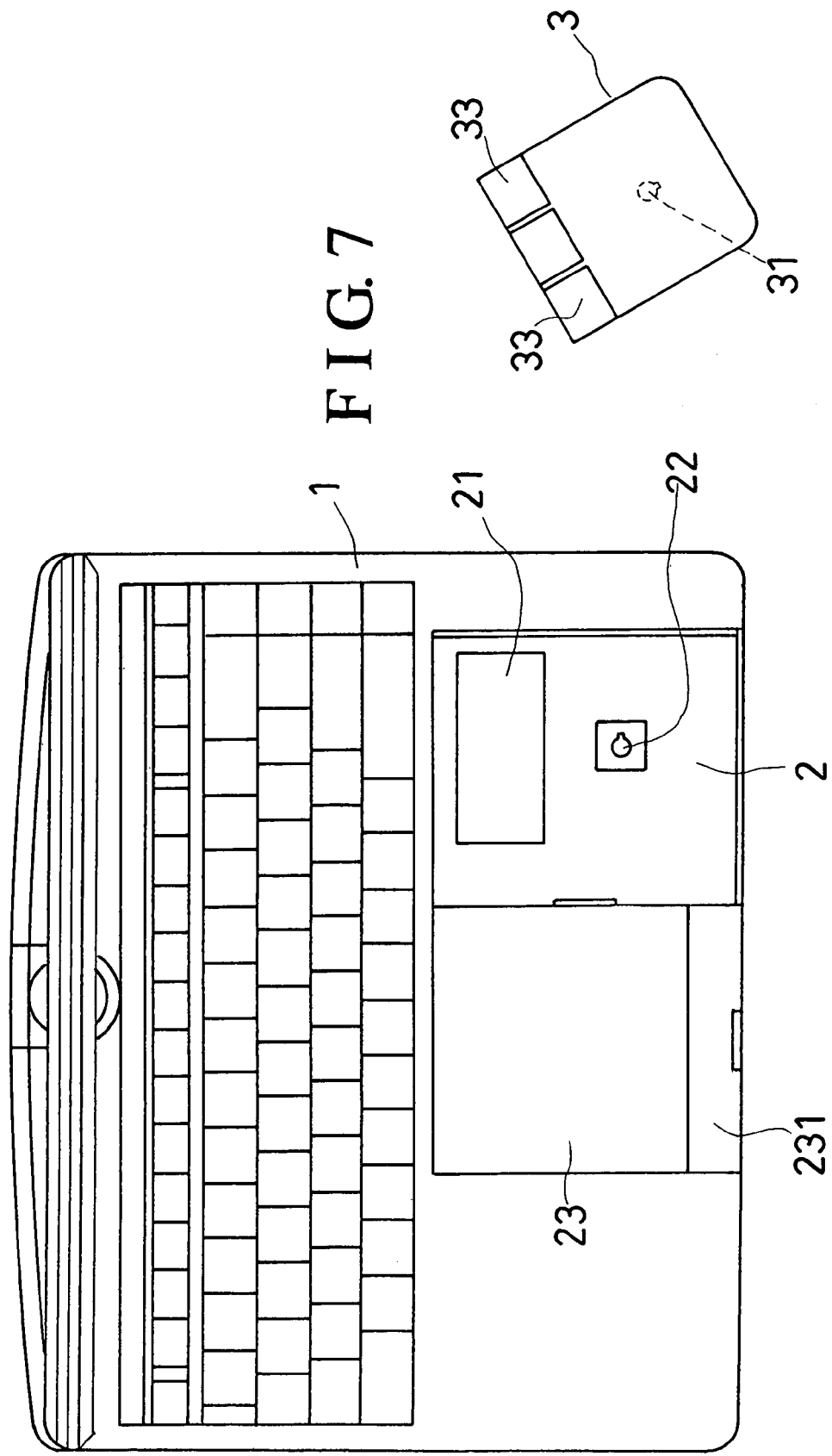

MOUSE DEVICE OF A LAPTOP COMPUTER

BACKGROUND OF THE INVENTION

1. Field of the Invention

The present invention relates to an improvement on a mouse device of a laptop computer, more particularly one, which is built into a laptop computer so that the user doesn't have to worry about forgetting to carry the mouse device.

2. Brief Description of the Prior Art

Conventionally, there are two different ways to move the cursor of a laptop computer, which are to use a touchpad built into the laptop computer, and to use a mouse, which has to be connected to the laptop computer every time before the computer is used. Both of the above methods are found to have their respective disadvantages:

If the touchpad is used, the user has to hit the touchpad with his fingers frequently and slide the fingers on the touchpad for a relatively short distance frequently. Consequently, each action to move the cursor will take more time, and the computer can't be used efficiently.

If the user wants to use a mouse instead, he/she has to carry the mouse, and there has to be a flat and large enough area for the mouse to move on. In other words, the user won't be able to use a mouse if he forgets to carry one or there isn't a flat and large enough area for the mouse to move on.

SUMMARY OF THE INVENTION

It is a main object of the invention to provide an improvement on a mouse device of a laptop to overcome the above disadvantages.

The mouse device of the invention includes a holding member secured on a laptop computer, and a mouse member. The holding member has a holding room, a signal receiving plate, and a stick, which is movable within an area of the holding room. The mouse member has a hole on a lower side thereof, and it is held in the holding member and connected to the movable stick with the movable stick being passed into the hole thereof. The mouse member has a signal transmitting unit on a lower side thereof, which can give signals to the signal receiving plate, such that one person can move a cursor by means of sliding the mouse member so as to move the signal transmitting unit within the signal receiving plate.

BRIEF DESCRIPTION OF THE DRAWINGS

The present invention will be better understood by referring to the accompanying drawings, wherein:

FIG. 2 is an interior view of the holding member of the present mouse device, with the cover being in the closed position (1), FIG. 3 is an interior view of the present mouse device, with the cover being in the closed position (2), FIG. 5 is a front view of the holding member of the present mouse device, with the cover being in the open position (2), FIG. 6 is an interior view of the present mouse device, with the cover being in the open position (3), and FIG. 7 is a top view of a laptop computer and the present mouse device, with the mouse member being apart from the holding member.

DETAILED DESCRIPTION OF THE PREFERRED EMBODIMENTS

Figure 1:
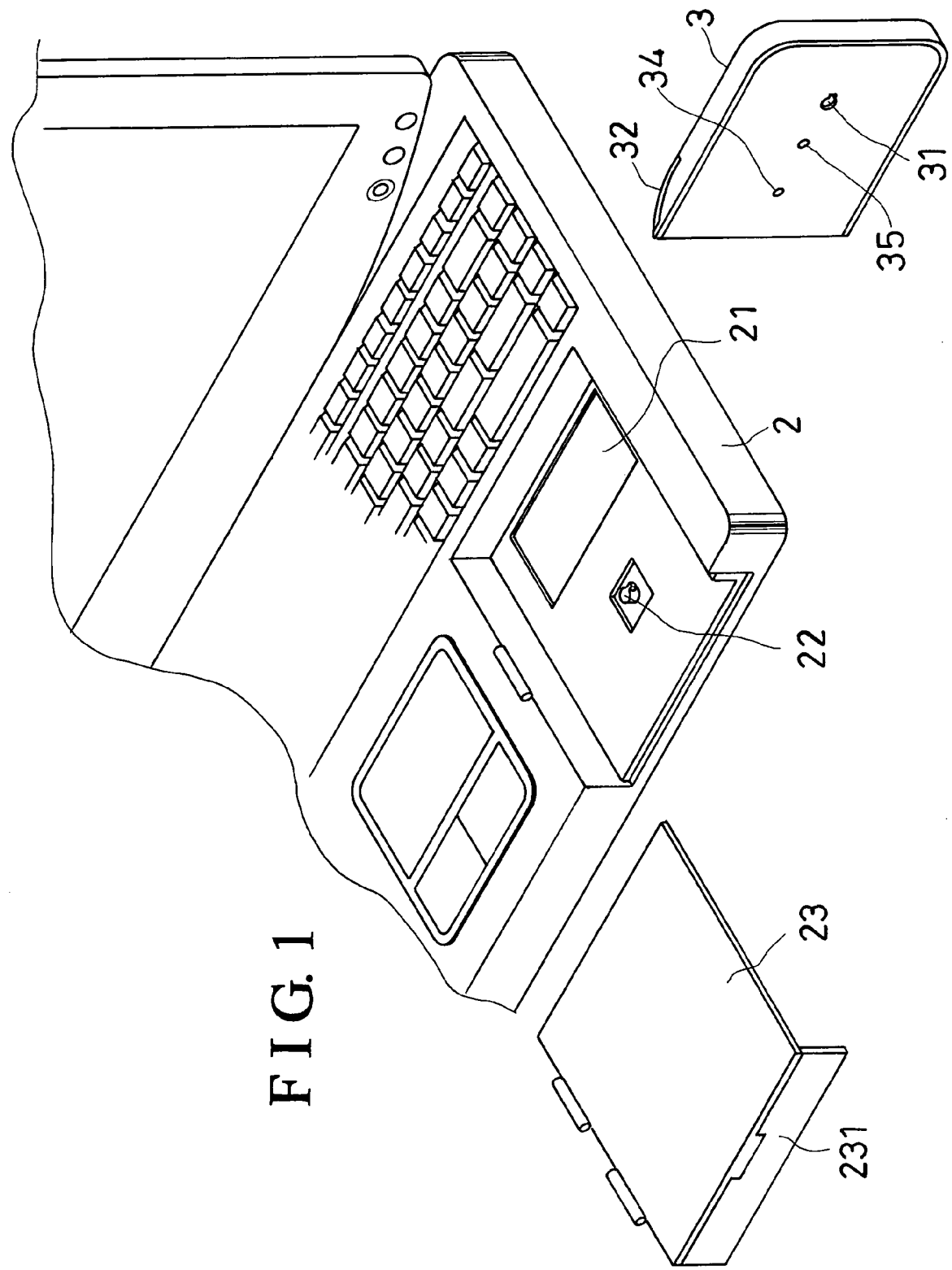
FIG. 1 is an exploded perspective view of the mouse device of a laptop computer according to the present invention.
Figure 4:
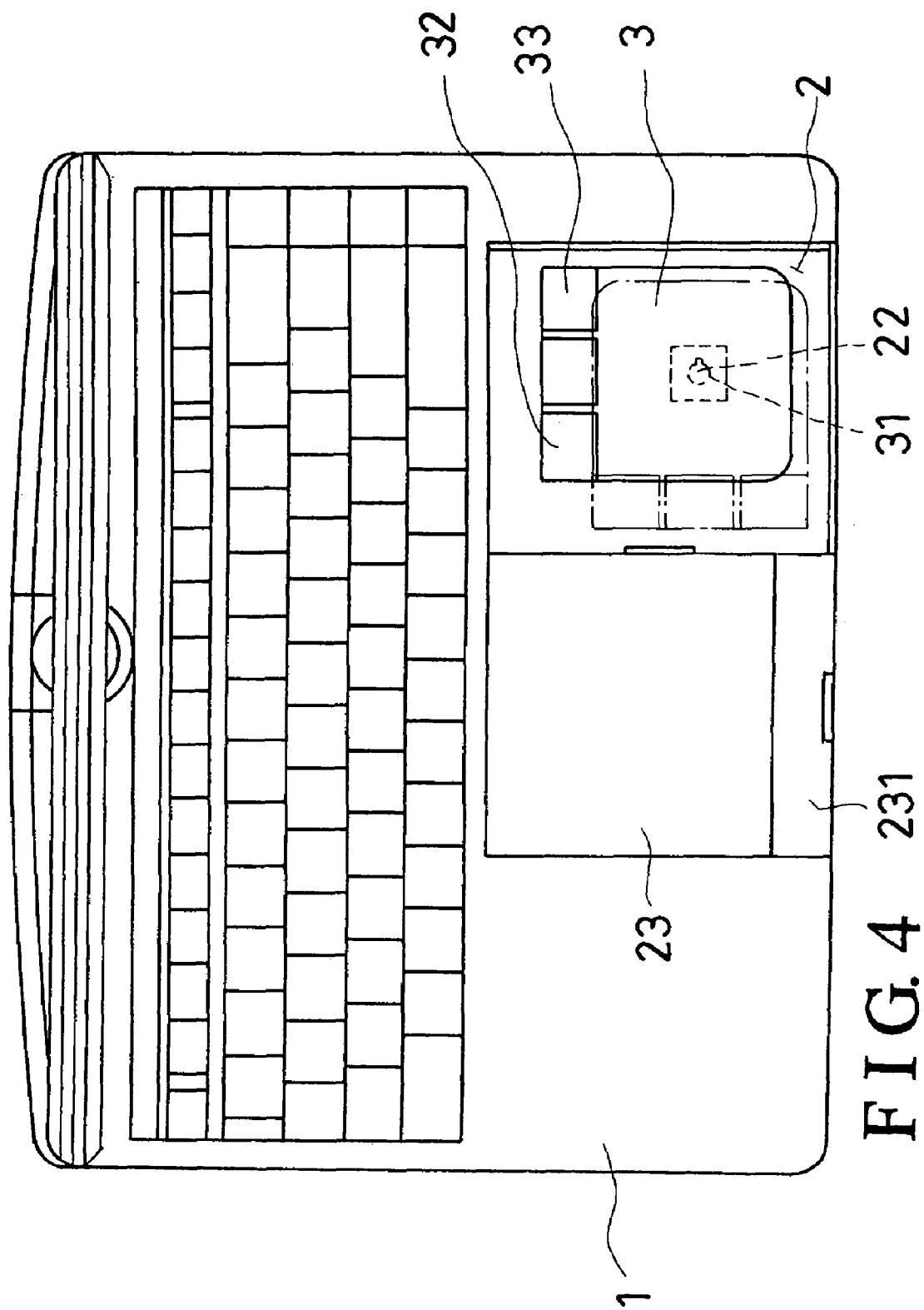
FIG. 4 is a top view of a laptop computer, with the cover of the present mouse device being in the open position (1)

Referring to FIG. 1, a preferred embodiment of a mouse device of a laptop computer 1 includes a holding member 2, and a mouse member 3.

The holding member 2 is fitted in a recess of the laptop computer 1, and it has a holding room, a signal receiving plate 21 in the holding room, a movable stick 22 projecting up in the holding room, and a cover 23. The movable stick 22 can move within a certain area of a lower side of the holding member 2. The movable stick 22 has a protrusion 221 thereon. The cover 23 is pivoted on the holding member 2 for covering an upper opening of the holding member 2 with, and the cover 23 has a pivoted front fence part 231 for covering a front opening of the holding member 2 with; the front fence part 231 can be pivoted to a horizontal position after the cover 23 is opened, as shown in FIG. 6.

The mouse member 3 has a hole 31 on a lower side, left and right buttons 32 and 33, a signal transmitting unit 34 on the lower side, and a signal source 35 on the lower side; the signal source 35 can be an optical one or equipped with a ball. The hole 31 has such a shape as to allow the movable stick 22 to pass through. The mouse member 3 can be held in the holding member 2, and connected to the movable stick 22 with the movable stick 22 being passed into the hole 31 of the mouse member 3; after the movable stick 22 has been passed into the hole 31, the mouse member 3 is turned such that the signal transmitting unit 34 is on the signal receiving plate 21, and such that the protrusion 221 of the movable stick 22 is engaged with the mouse member 3 to prevent the mouse member 3 from separating from the movable stick 22.

Consequently, when the mouse member 3 is slid on the lower side of the holding member 2, the signal transmitting unit 34 will move within the signal receiving plate 21, which will receive signals from the signal transmitting unit 34, and the cursor will move on the screen of the laptop computer 1 in the same direction as the signal transmitting unit 34. And, after the mouse member 3 has been separated from the movable stick 22, and taken out of the holding member 2, the user can input data into the signal receiving plate 21 with his/her hands.

Furthermore, referring to FIG. 7, after the mouse member 3 is separated from the movable stick 22, the mouse member 3 can be used on a desk, like an ordinary mouse; signals will be wirelessly transmitted from the signal source 35 to the laptop computer 1 to control the cursor.

From the above description, it can be easily understood that the mouse device of the invention has the following advantages:

1. The user doesn't have to worry about forgetting to carry a mouse because the holding member is connected to the laptop computer, and the mouse member is held in the holding member; in other words, the present invention is more convenient to use.

2. The mouse member can be used within the holding member after it is connected to the movable stick. Therefore, there is no need for a desk to hold the mouse member thereon.

3. When a flat and large enough area is available outside the laptop computer, the mouse member of the invention can be used in a wireless manner outside the holding member.

4. The mouse member is easy to store, together with the laptop computer, and in turn the possibility of the mouse member getting lost is reduced.

What is claimed is:

1. An improvement on a mouse device of a laptop computer, comprising
    a holding member secured on a laptop computer; the holding member having a holding room; the holding member having a signal receiving plate in the holding room; the holding member having a stick therein, which is movable within an area of the holding room; and
    a mouse member having a hole on a lower side thereof; the mouse member being held in the holding member and connected to the movable stick with the movable stick being passed into the hole thereof; the mouse member having left and right buttons; the mouse member having a signal transmitting unit on a lower side thereof; the signal transmitting unit being capable of giving signals to the signal receiving plate when facing the signal receiving plate, thus allowing a cursor to be moved by means of sliding the mouse member so as to move the signal transmitting unit within the signal receiving plate.

2. The mouse device as claimed in claim 1, wherein the movable stick has a protrusion thereon, and the hole of the mouse member has such a shape as to allow the movable stick to pass through; after the movable stick has been passed into the hole, the mouse member is turned such that the protrusion of the movable stick is engaged with the mouse member to prevent the mouse member from separating from the movable stick.

3. The mouse device as claimed in claim 1, wherein the mouse member has a signal source on the lower side thereof for allowing the mouse member to be used alone after the mouse member has been separated from the holding member.

4. The mouse device as claimed in claim 3, wherein the signal source is an optical one.

5. The mouse device as claimed in claim 3, wherein the signal source is equipped with a ball.

\* \* \* \* \*